United States Patent Office.

HENRY LOBDELL, OF WEST TROY, NEW YORK.

ADHESIVE PASTE.

SPECIFICATION forming part of Letters Patent No. 492,515, dated February 28, 1893.

Application filed August 12, 1892. Serial No. 442,897. (No specimens.)

*To all whom it may concern:*

Be it known that I, HENRY LOBDELL, a citizen of the United States, residing at West Troy, county of Albany and State of New York, have invented certain new and useful Improvements in Adhesive Paste, of which the following is a specification.

My invention relates to such improvements and consists of the novel construction and combination of parts hereinafter described and subsequently claimed.

Mucilaginous adhesive pastes, as heretofore prepared, have, when allowed to dry upon a paper or other surface, possessed a stickiness or viscosity that rendered them extremely sensitive to slight degrees of moisture, as the humidity of the atmosphere; and all such pastes have possessed more or less color which was imparted to the paper to which the paste was applied. Even when a good quality of gum is used, as on the backs of postage stamps, the staining quality of the paste is apparent, while its viscid and excessively sticky nature renders it impossible to carry stamps about the person on a warm day without their adhering to each other and to objects with which they come in contact, unless separated by leaves of tin-foil, paraffine paper or similar substance.

The object of my invention is to provide a paste which, when dried or evaporated, will be sufficiently absorptive to remain unaffected by atmospheric moisture, but will be adhesive when dissolved in water, and that will not stain or discolor the article to which it is applied. I have ascertained that, by adding to a viscid, mucilaginous paste a quantity of raw flour, I am able to reduce its gumminess or stickiness, and impart to the compound an absorptive quality that renders it practically unaffected by atmospheric moisture, and to wholly, or in large part, overcome the staining quality. By thus rendering the paste absorptive I do not destroy its adhesive nature, which becomes apparent as soon as the paste is dissolved in water, in which it is freely soluble. I have secured these results from the application of raw flour to solutions of simple gums, as dextrin, and to mucilaginous decoctions, such as is produced by boiling a mixture of flour and water.

My preferred method of preparing my improved paste consists in first mixing a quantity of flour with about five times its weight of water, and subjecting the mixture to a high degree of heat until it is converted into a viscid, mucilaginous mass, the best results being obtained when the mixture is subjected to heat under steam pressure for about twenty minutes. When the viscid mixture thus formed has been reduced to a comparatively low temperature, but while yet warm, I add thereto of the amount of the cooked flour in the process a proportion of about one-fourth of its weight of raw or uncooked flour. The ingredients are then uniformly intermixed and allowed to stand several hours and become cool, when the paste is in condition for use, and may be applied to the paper or other surface to be made adhesive, in the usual manner, and be allowed to dry thereon.

Stamps, envelopes and other articles prepared with my improved paste are not sticky to the touch, and may be safely carried about the person on warm days in a humid atmosphere, and will not exhibit adhesive qualities until perceptible moisture has been applied to the paste.

This paste is especially adapted to be applied to wall decorations to form an adhesive paper which can be safely transported and kept in rolls until needed for use, without the contiguous surfaces of the paper adhering to each other in the roll; but when cold water is applied to the paste, the paper will readily adhere to either warm or cold surfaces. The finest qualities of paper may be coated with this paste, to render them adhesive, and remain pliable, smooth in finish and unchanged in color.

For convenience in handling and transporting the paste, in commerce, it is preferably evaporated at a low temperature in sheets or cakes and then pulverized by grinding in the usual manner but a less proportion of water is used in this process of manufacture. The powder thus formed needs only to be mixed with cold water to prepare it for use, and is wholly and immediately soluble, wherein it differs from other forms of dry paste.

When dissolved in water, this paste possesses a mobile quality, not found in other pastes, which allows the pasted surface to be freely moved or slipped along the surface whereon it is to be attached. This feature especially adapts my improved paste for use in scrap-books, where the inserted scraps are to be accurately located on the page, and for wall papers which have to be adjusted upon the wall to match patterns.

In my preferred form of paste, I employ cooked wheat flour as the viscid, mucilaginous element, and raw wheat flour as the absorptive element; but other ingredients may be added, or the mucilaginous element composed wholly or in part of one or more viscid gums; and other kinds of raw vegetable flour may be substituted for the raw wheat flour, and still retain many of the qualities that render my improved paste superior to pastes heretofore in use.

What I claim as new, and desire to secure by Letters Patent, is—

1. An adhesive paste consisting of a viscid or mucilaginous adhesive element cooked in water and intermixed with raw flour, substantially as described.

2. An adhesive paste consisting of cooked and uncooked wheat flour, uniformly intermixed, substantially as described.

3. An evaporated soluble paste consisting of cooked and uncooked flour uniformly intermixed, substantially as described.

4. The process of making an adhesive paste which consists in cooking a mixture of flour and water, partially cooling the mixture, then intermixing therewith raw or uncooked flour, and evaporating the product to dryness at a low temperature, substantially as described.

In testimony whereof I have hereunto set my hand this 11th day of August, 1892.

HENRY LOBDELL.

Witnesses:
GEO. A. MOSHER,
CHAS. T. FAULKNER.